June 23, 1964  F. E. BEST ETAL  3,137,892
POULTRY LEG CUTTER

Filed April 3, 1961  2 Sheets-Sheet 1

Inventors
FRANK E. BEST
WILLIAM J. PATTERSON
By R.A. Story
Attorney

June 23, 1964  F. E. BEST ETAL  3,137,892
POULTRY LEG CUTTER
Filed April 3, 1961  2 Sheets-Sheet 2
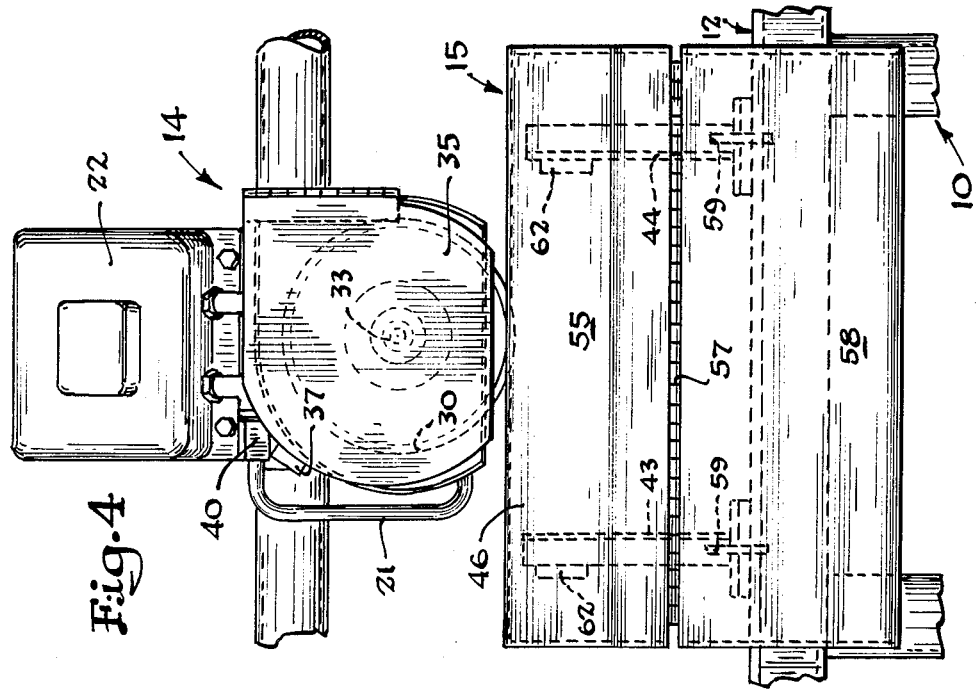
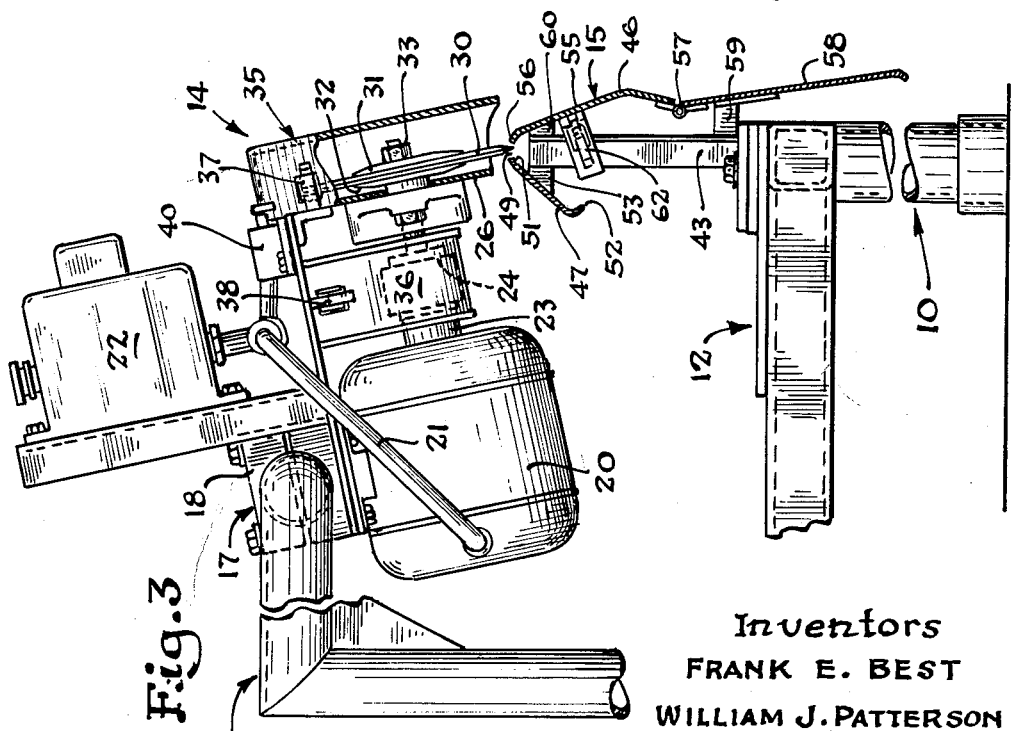
Inventors
FRANK E. BEST
WILLIAM J. PATTERSON
By R.G. Story
Attorney

United States Patent Office 3,137,892
Patented June 23, 1964

3,137,892
POULTRY LEG CUTTER
Frank E. Best, New Hyde Park, N.Y., and William J. Patterson, La Grange, Ill., assignors to Swift & Company, Chicago, Ill., a corporation of Illinois
Filed Apr. 3, 1961, Ser. No. 100,062
10 Claims. (Cl. 17—11)

This invention relates to an improved apparatus useful in poultry evisceration; and more particularly relates to an improved apparatus for severing the feet from birds.

In the processing of poultry for the consumers' market it is the usual practice to cut the feet from the birds at about the hock joint. This step removes the lower leg, which does not contain any appreciable amount of meat, from the upper leg, commonly known as the drumstick, and the remainder of the bird. Historically this operation has been performed by hand with a sharp instrument such as a knife, without noticeable damage to the bones articulated at the hock joint. However, for obvious reasons of economy and speed, it is highly desirable that this operation be performed with power equipment. Heretofore, such practices have resulted in substantial damage to the bones at the hock joint, producing unsightly or unsatisfactory product.

For a better understanding of this problem, it is helpful to visualize avian anatomy in the pelvic and leg area. The leg structure of birds generally comprises three major bones connected between the body of the bird and its feet. These bones are the femur, tibiotarsus and tarsometatarsus present in the thigh, "drumstick," and lower leg, respectively. The distal extremity of the tarsometatarus bone is connected with the digits or toes of a bird, and it is this portion, including the tarsometatarsus bone which is to be removed in the subject operation.

The joint which must be severed between the tibiotarsus and the tarsometatarsus bones, commonly known as the hock joint, is an articulation more properly identified as the tarsal joint. The distal extremity of the tibiotarsus bone at the tarsal joint is characterized by two condyles, or raised convex portions, at the outside edge, interspaced by an articular groove. These portions of the tibiotarsus bone closely mate with the proximal extremity of the tarsometatarsus bone, comprising a pair of sagittal grooves, or concave areas, at the outer edges, interspaced by a sagittal spine, or convex area.

For proper separation of the feet from the bird at the tarsal joints, it is necessary that the cutting instrument pass between the tibiotarsus and tarsometatarsus bones without appreciably cutting of either the condyle or sagittal structures. If the raised areas on either bone are cut to any substantial depth, the product will be unsightly and a danger of loose bone fragments will be present.

Accordingly, it is a principal object of this invention to provide an improved apparatus for severing the feet from birds at the hock joint without appreciably cutting either leg bone.

It is another object of this invention to provide an improved apparatus for severing the feet from birds at the tarsal joint without appreciably cutting either the tibiotarsus or tarsometatarsus bones articulated at said joint.

It is a still further object of this invention to provide an improved apparatus for severing the feet from birds at the tarsal joint whereby the tibiotarsus and the tarsometatarsus bones, articulated at said joint, are separated as all connective tissues thereabout are cut.

Generally speaking, the present invention contemplates bending the legs of a bird at the hock or tarsal joint so as to better expose said joint, while at the same time tensioning it in a manner tending to separate the tibiotarsus and tarsometatarsus leg bones. When the legs of the bird are in the proper flexed position, the skin, tendons, and all other connective tissues about the tarsal joints are severed by forcing a relatively broad cutting instrument between the aforementioned leg bones at the joint in such a way as to further induce separation of the leg bones. Novel apparatus devised for carrying out this method comprises leg guide means about which the birds' legs are bent to a preferred angle to tension the tarsal joints, and a severing means angularly associated with the guide to obtain optimum penetration and separation of the leg bones while cutting all connective tissues.

One embodiment of an apparatus for performing the present invention has been illustrated in the accompanying drawings, but it is to be expressly understood that said drawings are for purposes of illustration only and are not to be taken as a definition of the limits of the invention, reference being had to the appended claims for this purpose.

In said drawings:

FIGURE 3 is a front elevation view of the apparatus, with parts broken away, for severing feet from poultry; and FIGURE 4 is a side elevation of the apparatus of FIGURE 3.

Expanding upon the method of the present invention, we have found that the tarsal joint of a bird may be flexed and tensioned in such a manner so as to provide an optimum exposure of the joint to a cutting blade approaching from about one side and the front of said joint. That is, the bones articulated at the tarsal joint may be pulled apart somewhat to receive the cutting blade; and the blade itself may be used to further part the bones in the joint so that none, or at least very little, of the bone is severed by the blade.

Figure 2:
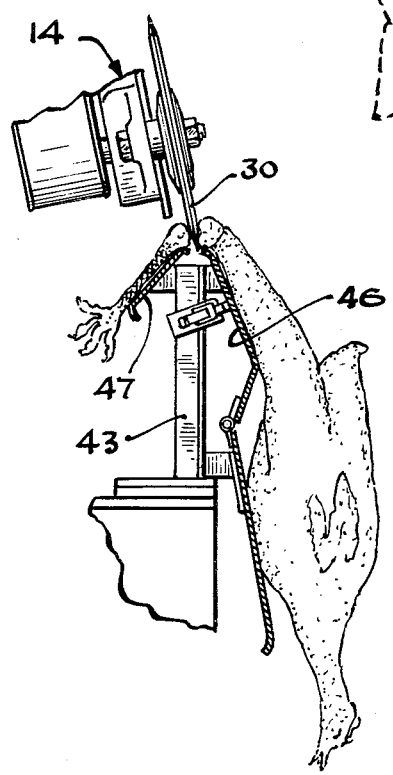
FIGURE 2 is a partial sectional view showing the legs of a bird in position to be cut with parts of the apparatus omitted.

In performing this method the lower and upper legs (tarsometatarsus and tibiotarsus bones, respectively) should be flexed at the hock (tarsal) joint, in the direction normally permitted by the fowl's skeletal structure, to include an acute angle. Preferably, the included angle between the upper and lower legs is about 68.5°. Hence, the included angle between the tarsometatarsus and tibiotarsus bones is approximately the same, although the flesh about the latter bone may cause the angle to vary somewhat. When the legs are so bent, a cutting instrument, preferably a rotating blade, is inserted into the joint from a point generally at one side of the leg. It has been found that the cutting instrument should be positioned at an obtuse angle to the tarsometarsus bone, in a direction away from the aforementioned included angle, preferably of about 119.5°. FIGURE 2 graphically illustrates the preferred relation between leg bone and knife for properly severing the feet from a bird.

Separation of the tibiotarsus and tarsometatarsus bones is further enhanced where the severing operation is accomplished with a blade having a relatively broad body which tapers quickly to a cutting edge. When practicing the method, this type of blade structure permits the body of the blade to drive or wedge the distal and proximal extremities of the tibiotarsus and tarsometatarsus bones, respectively, further apart before the cutting edge could cut into the saggital spine of the tarsometatarsus bone.

One embodiment of an apparatus for carrying out the preceding method is shown in the drawings. Referring to FIGURES 3 and 4, the apparatus may be seen to reside upon a frame, generally 10, comprising an overhead cantilever member 11, and a table-like frame bed 12. The severing means generally 14 is supported upon the cantilever 11 and a bird leg guide means generally 15 is supported upon the frame bed 12.

Figure 1:
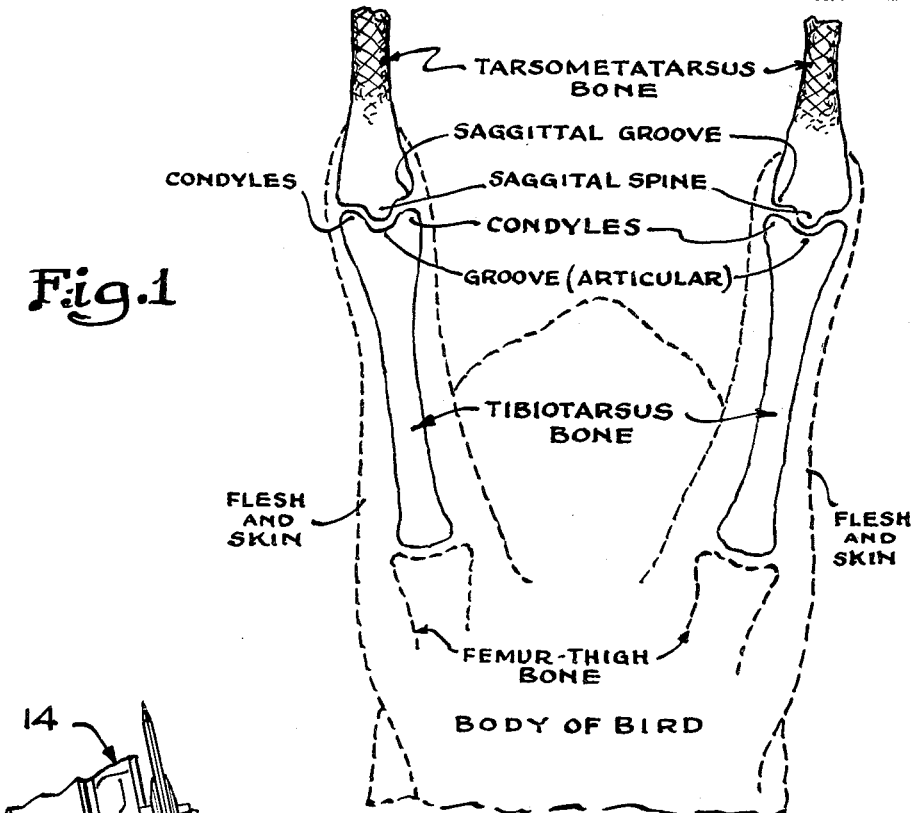
FIGURE 1 is a representative view of the general leg structure of birds, the legs being shown in section, with the bones somewhat exaggerated for clarity.

The severing means, as may be seen in FIGURES 1 and 2, is built upon a subframe generally 17 which is frictionally secured to the cantilever member 11 by a split yoke assembly 18. As will become clear, the severing means generally 14 may be adjusted angularly with respect to the leg-guide means generally 15 by appropriate manipulation of the split yoke 18 to permit the pivoting of subframe 17 on the cantilever member 11.

An electric motor 20 is fastened to the underside of subframe 17 and is connected by electric cable 21 through a conventional power control box 22 to a source of electric power, not shown. The motor 20 includes a shaft 23 extending forwardly, away from the cantilever 11, to a mandrel generally 24. The shaft and mandrel are joined by set screws or the like (not shown) and the mandrel is journaled in bearing surfaces of a face plate generally 26, which is fastened substantially perpendicular to the subframe 17.

A circular knife blade 30 is fastened to the mandrel generally 24 beyond the face plate 26 between a pair of washers 31–32, by a hexagonal nut 33. The knife 30 is almost completely enclosed by a cover guard 35 which is hinged to the rear edge of face plate 26. An additional guard 36 covers most of the shaft and coupling beneath the subframe 17. Both the cover guard 35 and shaft guard 36 are releasably secured to the subframe structure 17 by means of latches 37 and 38 respectively. Additionally, a safety switch generally 40 is secured to the subframe 17 adjacent the closed position of knife cover guard 35, and is electrically in series between the power control box 22 and motor 20. Thus, whenever the cover guard 35 is opened to expose the circular knife 30, the electrical connection to the motor 20 will be broken so as to prevent operation of the apparatus.

We have found that a relatively thick circular knife 30 is most advantageous, and, therefore, preferable, when cutting the tarsal or hock joints of poultry according to the present invention. As previously indicated, the relatively wide blade provides a wedging action when entering between the bones of the tarsal joint. Accordingly, for this purpose we have found that with an 8-inch diameter blade ¼-inch thick, and with a ⅜-inch bevel unusually good results may be obtained. Also, in cooperation with the leg guide means generally 15, hereinafter more completely described, it has been found that a particularly advantageous attitude for the knife blade 30 is at 13° from the vertical.

The leg guide means generally 15 is mounted directly beneath the position of knife 30 on a pair of upstanding stanchions generally 43–44. The guide means 15 comprises an angle guide for the upper and lower leg portions of a bird and includes two separate portions, namely a first guide 46 (to the right or outside in FIGURE 3) and a second guide 47 (to the left in FIGURE 3) providing outer surfaces against which the leg members containing the tibiotarsus and the tarsometatarsus bones, respectively, are pressed.

As may be seen in FIGURE 4, the first guide 46 extends longitudinally aligned with the plane of circular knife blade 30 for a substantial distance. The second guide 47 is of substantially the same length. As may be seen in FIGURE 3, the first and second guides are positioned angularly with respect to one another and spaced slightly to provide a longitudinal opening 49 along the apex of their included angle into which the edge of circular knife 30 extends very slightly. The second guide 47 is a substantially flat plate set at an angle of about 42.5° beneath the horizontal. The upper longitudinal edge 51 of the second guide 47 is preferably curved toward the first guide 46 on a small radius of about 5/16-inch. The lower and side edges of the second guide 47 are turned under to form strengthening ribs 52. The second guide is fixed to a pair of angular flanges 53 on stanchions 43–44 to position it at an angle below horizontal.

On the opposite side of the stanchions 43–44 is located the first guide 46. This guide comprises a substantially flat area 55 having the upper longitudinal edge 56 bent inwardly, toward the second guide 47, about a small radius of about 7/16-inch. The lower edge of the first guide, however, is arched slightly and pivotally connected by a hinge 57 to a stationary apron 58 which in turn is fastened to flanges 59 extending from the bottom of stanchions 43–44. Preferably, the flat area 55 of the first guide 46 is positioned at an angle of about 69° below horizontal when resting against angular pedestals 60 at the upper ends of stanchions 43–44. Also the pedestals 60 position the upper longitudinal edge 56 of the first guide 46 at approximately ¼-inch distance from the corresponding upper edge 51 of the second guide 47. A latch 62 releasably connects the underside of the first guide 46 to the stanchion 43. For purposes of cleaning the apparatus, the latch 62 may be released and the first guide 46 swung open to expose the apparatus for maintenance and cleaning operations.

It will follow in the above described structure that the included angle between the first and second guide means, 46 and 47, respectively, will be about 68.5°. The latter acute angle is desirable in practicing the method of this invention to develop the proper bend and tension in the tarsal joints of a bird. However, due, at least in part, to the varying fleshiness between groups of birds, an acute angle within a few degrees of this figure should prove satisfactory. Similarly, we have found that the plane of the severing means generally 14 should be maintained at an obtuse angle within a few degrees of about 119.5° to the surface of the second guide 47. We prefer that the preceding angles be within plus or minus 2° of the stated optimum figures. Also, it should be obvious that the included angle, and the angular relationship of the guide means generally 15 to the circular knife 30, are fundamental criteria to the method of this invention rather than the respective angles to arbitrary horizontal and vertical plane. That is, the apparatus and method would be operable at substantially any attitude with respect to horizontal so long as its internal relationships are maintained about the same.

In operation, an operator may approach the apparatus from one end while grasping a fowl, holding the feet in one hand and the body in the other hand. It is preferable to introduce the legs of a bird to the action of the rotating knife from an end where the action of the cutting edge is downward. For example, with a counter-clockwise rotation of knift 30, as viewed in FIGURE 4, the bird is introduced from the left end. Either end may be selectively utilized if the motor 20 is reversible. The tarsal joint is placed directly above the longitudinal opening 49 between the first and second guides, 46, 47. However, the bird must be held with its body against the first guide 46 and the apron 58 directly therebeneath for that purpose. Thus, the tibiotarsus bone will be generally in line and against the first guide 46. While thus holding the body of a bird, the operator, with his other hand pulls downwardly on the bird's feet against the second guide 47. This action both bends the tarsal joint and tensions it so as to slightly separate the tarsometatarsus bone from the tibiotarsus bone at the joint. Finally, while maintaining this posture of the bird, the operator pushes it away from himself and into the path of the whirling circular knife 30. As previously indicated, the action of the relatively broad knife entering from one side of the tarsal joint will further tend to wedge apart the bones at said joint and sever all connective tissues without appreciably cutting either the condyles of the tibiotarsus bone or the sagittal spine of the tarsometatarsus bone, or any other portions of such bones.

Obviously many modifications and variations of the invention as hereinbefore set forth may be made without departing from the spirit and scope thereof, and therefore only such limitations should be imposed as are indicated in the appended claims.

We claim:

1. An improved apparatus for severing the feet from poultry, said apparatus comprising: a fixed angle guide means defining an angle about which the legs of a bird may be bent to upwardly expose the hock joints of said bird, the angle of said guide means being sufficient to cause a separating tension in said hock joints between the upper and lower leg bones when thus bent; and a single severing means cooperatively aligned with said guide means for cutting through all connective tissues about said hock joints.

2. An improved apparatus for severing the feet from poultry, said apparatus comprising: a fixed angle guide means defining an included angle of less than 90° about which the legs of a bird may be bent to upwardly expose the tarsal joints of said bird, and to cause a separating tension between the tibiotarsus and tarsometatarsus bones at said point when so bent, said guide means having a longitudinal opening along its apex; and a single severing means cooperatively aligned to extend to within about said opening whereby to cut through all connective tissues about a tarsal joint.

3. An improved apparatus for severing the feet from poultry, said apparatus comprising: a fixed angle guide means defining an included angle of less than 90° about which the legs of a bird may be bent to upwardly expose the tarsal joints of said bird, and to cause a separating tension between the tibiotarsus and tarsometatarsus bones at said point when so bent, said guide means having a longitudinal opening along about its apex; and a single severing means cooperatively aligned to extend to within about said opening whereby to cut through all connective tissues about a tarsal joint, said severing means including a relatively broad structure closely adjacent a cutting edge for further separating said bones at said joint.

4. An improved apparatus for severing the feet from poultry, said apparatus comprising: a leg guide having a first surface and a second surface maintained so as to include an angle of about 68.5° and having a longitudinal opening along about the apex of said included angle; and severing means cooperatively aligned to extend to within about said opening whereby to sever the connective tissues about the tarsal joints of a bird bent upon said guide so as to expose said joints at said opening.

5. An improved apparatus for severing the feet from poultry, said apparatus comprising: a leg guide having a first surface and a second surface maintained so as to include an angle of about 68.5°, and having a longitudinal opening along about the apex of said included angle; and a knife aligned to extend to within about said opening and positioned generally in a plane at an angle of about 119.5° above one of said surfaces whereby to sever the connective tissues about the tarsal joints of a bird bent upon said guide so as to expose said joints at said opening while entering between the tibiotarsus and tarsometa-tarsus bones without appreciably cutting either of said bones.

6. The apparatus of claim 5 wherein the knife includes a relatively broad body tapering rapidly to a cutting edge.

7. The apparatus of claim 6 wherein the knife is a rotatable blade.

8. An improved apparatus for severing the feet from poultry, said apparatus comprising: a first leg guide for generally positioning the tibiotarsus bones of a bird, said guide having a longitudinal edge slightly curved; a second leg guide longitudinally parallel to said first guide for generally positioning the tarsometatarsus bones of a bird, said second guide also having a slightly curved longitudinal edge extending toward the curved edge of said first guide said edges spaced by a narrow opening and the first and second guides positioned to include an acute angle from about said opening; and a rotatable knife generally aligned to extend to about within said opening and positioned in a plane at an obtuse angle from said second guide, whereby to sever the connective tissues about the tarsal joints of a bird bent upon said guides so as to expose said joints at said opening while entering between the tibiotarsus and tarsometatarsus bones without appreciably cutting either of said bones.

9. An improved apparatus for severing the feet from poultry, said apparatus comprising: a first leg guide for generally positioning the tibiotarsus bone of a bird, said guide having a longitudinal edge slightly curved; a second leg guide longitudinally parallel to said first guide for generally positioning the tarsometatarsus bones of a bird, said second guide also having a slightly curved longitudinal edge extending toward the curved edge of said first guide said edges spaced by a narrow opening and the first and second guides positioned to include an acute angle of about 68.5° from about said opening; and a rotatable knife generally aligned to extend to about within said opening and positioned in a plane at an obtuse angle of about 119.5° from said second guide, whereby to sever the connective tissues about the tarsal joints of a bird bent upon said guides so as to expose said joints at said opening while entering between the tibiotarsus and tarsometatarsus bones without appreciably cutting either of said bones.

10. An improved apparatus for severing the feet from poultry, said apparatus comprising: a leg guide having a first surface and a second surface maintained so as to include an angle of less than 90° and having a longitudinal opening along about the apex of said included angle; and severing means cooperatively aligned to extend to within about said opening whereby to sever the connective tissues about the tarsal joints of a bird bent upon said guide so as to expose said joints at said opening.

References Cited in the file of this patent

UNITED STATES PATENTS

| | | |
|---|---|---|
| 1,690,508 | Stokes | Nov. 6, 1928 |
| 2,310,881 | Swanson | Feb. 9, 1943 |
| 2,846,718 | Sengelaub et al. | Aug. 12, 1958 |
| 2,854,690 | O'Donnell | Oct. 7, 1958 |
| 2,855,624 | Jerome et al. | Oct. 14, 1958 |
| 3,038,197 | Turner | June 12, 1962 |